May 3, 1955

W. K. WIGINTON 2,707,474

TOOLS FOR BATHS OF FILTER CLEANERS

Filed April 20, 1953

INVENTOR.
William K. Wiginton
BY Chas Senegre
Attorney.

United States Patent Office 2,707,474
Patented May 3, 1955

2,707,474

TOOLS FOR BATHS OF FILTER CLEANERS

William K. Wiginton, Birmingham, Ala.

Application April 20, 1953, Serial No. 349,706

2 Claims. (Cl. 134—102)

This invention relates to a tool for easy oil cleaning air filters of various kinds but especially for filters used on internal combustion motors. The common practice in general use for oil bathing air filters is to submerge the filter in light oil, move it about therein, and then take it out and allow it to dry. Such a method does not remove all of the dirt in the filter.

Further objects are to provide a tool that will be highly efficient for the purpose intended, simple in structure, cheap to manufacture, easy to use, and extremely durable.

Other objects and advantages will appear from the drawings and specification.

Figure 1:
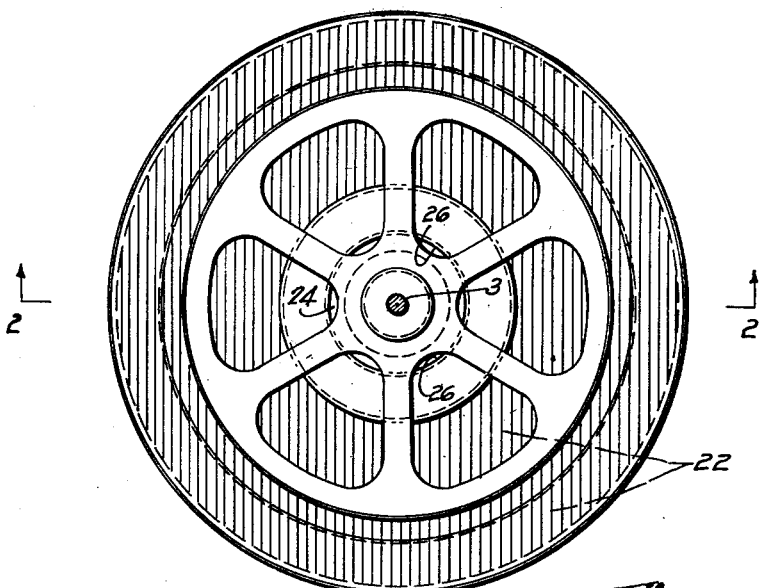
Figure 2:
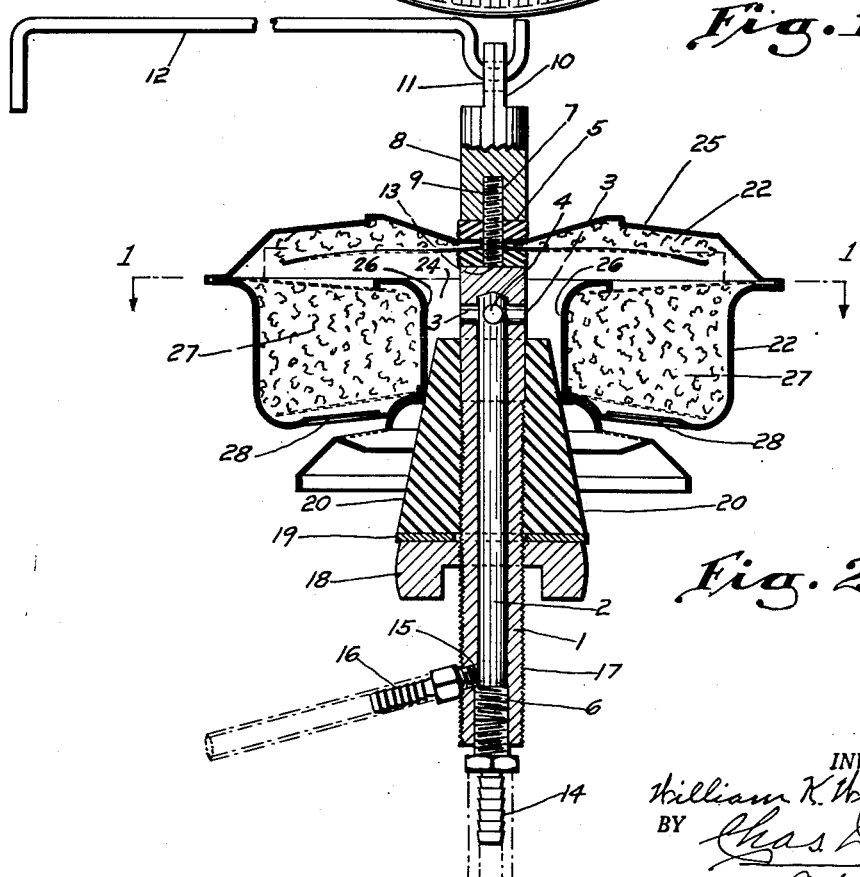

By referring generally to the drawings, it will be observed that Fig. 1 is a sectional view on line 1—1 of Fig. 2; Fig. 2 is a sectional view on line 2—2 of Fig. 1.

Similar reference numerals refer to similar parts throughout the several views.

Referring to the drawings in detail it will be seen that the tool comprises a main metal round bar 1 having a hole 2 in its center leading from its bottom end to its upper portion where it makes contact with cross holes or outlets 3 and 4. The top portion of the bar is separated at 5 and provided with a threaded hole 13 into which one end of a headless bolt 7 is inserted. The separated portion 8 of the bar is also provided with a threaded hole 9 that accommodates the upper end of the bolt. The top end 10 of the bar is made flat and has a hole 11 therethrough for easy hanging on a suitable arm or bracket 12. The bottom end of the bar hole 2 is threaded for an air hose connector 14. A side hole 15 is threaded for an oil line connector 16. The outer face of the bar is provided with threads 17 for the wing nut 18 to fit adjacent a washer 19 that is in contact with a truncated cone shaped rubber plug 20. The parts so far mentioned comprise the tool assembly. The filter 22 is no part of the invention and is shown for the purpose of explaining how the tool is used.

From the foregoing it will appear that when the tool is used with the type of air filter shown in Fig. 1 and Fig. 2 the bar with plug thereon and top portion off is inserted through the hole 24 surrounded by filtering material 27 in the upper portion of the filter. Then the bar is clamped to the top 25 of the filter by the bolt and top of bar portion, then the plug is forced in tight by the wing nut, then compressed air is let in through the air connector, the air draws in light oil through the oil connector, then the oil is forced out through the cross holes or outlets in the bar and strikes the inner wall 26 of the filter and spreads out over the top of the filtering material 27 and finally flows out of the opening 28 of the filter assembly.

The various parts of the tool may be made of any material suitable for the purpose, but I prefer to use metal and rubber. Also the parts may be made in different sizes and capacities, depending on the sizes of air filters on which to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A tool of the class described for oil baths of filter cleaners comprising, two pieces of round metal bar, one piece being longer than the other and designated as the lower piece, the other piece being the upper, the lower piece having a round hole in its center extending from its bottom end to a point near its top end where it diverges into four outlets leading to and through the outer face of the bar, the portion of the bar above the said outlets having a threaded hole therein, a headless bolt with one end thereof screwed into said threaded hole; the bottom end of the hole in the bar being threaded to accommodate an air hose connector, the bar at a point near its bottom having a hole leading to the center hole in the bar, said side hole being threaded to accommodate an oil line connector; the upper bar piece having a threaded hole in one end to accommodate the upper end of said headless bolt, the top end of the upper bar piece being formed flat and having a hole therethrough; the lower bar piece having screw threads on its outer face extending from its bottom end to near the outlets in its top portion; a round plug made of rubber, said plug having a hole through its center, the lower bar piece being inserted through the hole in the plug, washers and threaded nuts mounted on the bar and adjacent the plug for holding the plug in various positions on the lower bar piece.

2. A tool of the character described for oil baths of filter cleaners comprising, two pieces of round metal bar, one piece being longer than the other and designated as the lower piece, the other piece being the upper, the lower piece having a round hole in its center extending from its bottom end to a point near its top end where it diverges into four outlets leading to and through the outer face of the bar, the portion of the bar above the said outlets having a threaded hole therein, a headless bolt with one end thereof screwed into said threaded hole; the bottom end of the hole in the bar being threaded to accommodate an air hose connector, the bar at a point near its bottom having a hole leading to the center hole in the bar, said side hole being threaded to accommodate an oil line connector; the upper bar piece having a threaded hole in one end to accommodate the upper end of said headless bolt, the top end of the upper bar piece being formed flat and having a hole therethrough; the lower bar piece having screw threads on its outer face extending from its bottom end to near the outlets in its top portion; a truncated cone shaped plug made of rubber, said plug having a hole through its center, the lower bar piece being inserted through the hole in the plug, washers and threaded nuts mounted on the bar and adjacent the plug for holding the plug in various positions on the lower bar piece.

References Cited in the file of this patent

UNITED STATES PATENTS

| | | |
|---|---|---|
| 1,476,969 | Howard | Dec. 11, 1923 |
| 2,076,262 | Black | Apr. 6, 1937 |
| 2,450,308 | Smith | Sept. 28, 1948 |
| 2,564,402 | MacArthur | Aug. 14, 1951 |
| 2,638,381 | Paxton | May 12, 1953 |

FOREIGN PATENTS

| | | |
|---|---|---|
| 591,025 | Great Britain | Aug. 5, 1947 |